(12) United States Patent
Kawagishi et al.

(10) Patent No.: US 6,304,310 B1
(45) Date of Patent: Oct. 16, 2001

(54) LIQUID CRYSTAL APPARATUS

(75) Inventors: Hideyuki Kawagishi, Fujisawa; Yutaka Inaba, Kawaguchi, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 07/975,140

(22) Filed: Nov. 12, 1992

Related U.S. Application Data

(63) Continuation of application No. 07/692,961, filed on Apr. 26, 1991, now abandoned, which is a continuation of application No. 07/450,511, filed on Dec. 14, 1989, now abandoned.

(30) Foreign Application Priority Data

Dec. 20, 1988 (JP) .................................................. 63-319560

(51) Int. Cl.⁷ ........................................................ G02F 1/141
(52) U.S. Cl. .............................. 349/172; 349/34; 349/133
(58) Field of Search ...................................... 350/333, 332, 350/341, 346, 350 S; 340/784, 805; 349/133, 134, 132, 168, 172, 33.34, 37; 345/94, 96, 97

(56) References Cited

U.S. PATENT DOCUMENTS

| | | | |
|---|---|---|---|
| 4,668,051 | * | 5/1987 | Mourey et al. ............. 350/350 S |
| 4,707,078 | * | 11/1987 | Geary ............................... 350/350 S |
| 4,793,693 | * | 12/1988 | Shimoda et al. ..................... 359/56 |
| 4,832,462 | * | 5/1989 | Clark et al. ........................ 350/341 |
| 4,867,539 | * | 9/1989 | Goodby et al. ................ 350/350 S |
| 4,900,132 | * | 2/1990 | Bos ................................. 350/350 S |
| 4,932,758 | * | 6/1990 | Hanyu et al. .................. 350/350 S |
| 4,941,736 | * | 7/1990 | Taniguchi et al. ............. 350/350 S |
| 5,005,953 | * | 4/1991 | Kawagishi ........................... 359/63 |
| 5,013,137 | * | 5/1991 | Tsuboyama et al. ............ 350/341 |

FOREIGN PATENT DOCUMENTS

8702495 * 4/1987 (WO) .................................. 350/332

OTHER PUBLICATIONS

Clark et al—"Structures And Applications of SSFLC Devices" Japan Display 86—pp. 456–458.*

* cited by examiner

*Primary Examiner*—William L. Sikes
*Assistant Examiner*—Tai V. Duong
(74) *Attorney, Agent, or Firm*—Fitzpatrick, Cella, Harper & Scinto

(57) ABSTRACT

An liquid crystal apparatus, includes: (a) a liquid crystal device including: a pair of substrates each provided with a uniaxial alignment axis, and a chiral smectic liquid crystal having a negative dielectric anisotropy disposed between the pair of substrates and capable of forming a higher-temperature bistable alignment state and a lower-temperature bistable alignment state in its chiral smectic C phase, the chiral smectic liquid crystal being further placed in the lower-temperature bistable alignment state formed by cooling from the higher-temperature bistable alignment state; and (b) voltage application means including: an AC voltage application means for applying to the chiral smectic liquid crystal an AC voltage insufficient to cause a switching from one to the other or from the other to one of the bistable alignment state, and a switching voltage application means for applying to the chiral smectic liquid crystal a voltage of one polarity sufficient to cause a switching from one to the other of the bistable alignment state and a voltage of the other polarity sufficient to cause a switching from the other to one of the bistable alignment state.

13 Claims, 3 Drawing Sheets

△: EXAMPLE 2
○: COMPARATIVE EXAMPLE 2

LIQUID CRYSTAL APPARATUS

This application is a continuation of application Ser. No. 692,961, filed Apr. 26, 1991, now abandoned, which is a continuation of application Ser. No. 450,511, filed Dec. 14, 1989, now abandoned.

FIELD OF THE INVENTION AND RELATED ART

The present invention relates to a ferroelectric liquid crystal device applicable to, e.g., a printer head and a display, particularly a ferroelectric liquid crystal device which provides a larger apparent tilt angle and a bright display with a high contrast even by a low-voltage AC electric field.

In recent years, it has been expected to develop a large area display using a ferroelectric liquid crystal characterized by a high-speed responsiveness and a memory characteristic.

Particularly, a ferroelectric liquid crystal display of an AC stabilization scheme using a liquid crystal having a negative $\Delta\epsilon$ (dielectric anisotropy) is expected to realize a bright display with a high contrast.

However, in the case where a ferroelectric liquid crystal device of the above-mentioned AC stabilization scheme is used to constitute a large area display, the enlargement of an apparent tilt angle corresponding to an increase in AC voltage is rather moderate so that the following two contradictory problems arise.

(1) If the device is driven by applying a low AC voltage, the enlargement of apparent tilt angle $\theta_a$ is insufficient so that a bright display with a high contrast cannot be realized.

(2) On the other hand, as a panel having a small cell gap of 1–2 microns is used in a ferroelectric liquid crystal display, the capacitance between the upper and lower electrodes becomes much larger than that in a TN-liquid crystal panel. Further, the frequency of the AC electric field capable of achieving the AC stabilization effect is ordinarily as high as 10 kHz or higher. As a result, if an AC electric field of a high voltage is used, a large heat is evolved due to charging and discharging in the panel to result in a large temperature distribution in the panel related with a matrix circuit structure, so that only a narrow latitude is allowed for the driving voltage and driving pulse duration usable for display.

In order to solve the problem, it is desirable to provide a device capable of achieving the AC stabilization effect at an AC voltage which is sufficiently low to result in only a negligible extent of heat evolution in the panel. No method therefore, however, has been known heretofore.

SUMMARY OF THE INVENTION

In view of the problems of the prior art described above, an object of the present invention is to provide a ferroelectric liquid crystal device of the AC stabilization scheme which is capable of achieving a bright display with a high contrast at a lower AC voltage.

According to the present invention, there is provided a liquid crystal apparatus, comprising:

(a) A liquid crystal device comprising:
  a pair of substrates each provided with a uniaxial alignment axis, and
  a chiral smectic liquid crystal having a negative dielectric anisotropy disposed between the pair of substrates and capable of forming a higher-temperature bistable alignment state and a lower-temperature bistable alignment state in its chiral smectic C phase, the chiral smectic liquid crystal being further placed in the lower-temperature bistable alignment state formed by cooling from the higher-temperature bistable alignment state; and (b) voltage application means including:
  an AC voltage application means for applying to the chiral smectic liquid crystal and AC voltage insufficient to cause a switching from one to the other or from the other to one of the bistable alignment state, and
  a switching voltage application means for applying to the chiral smectic liquid crystal a voltage of one polarity sufficient to cause a switching from one to the other of the bistable alignment state and a voltage of the other polarity sufficient to cause a switching from the other to one of the bistable alignment state.

In a preferred embodiment, the chiral smectic liquid crystal assumes smectic A phase forming a pretilt angle of liquid crystal molecules of 1.5° or larger with the substrates.

These and other objects, features and advantages of the present invention will become more apparent upon a consideration of the following description of the preferred embodiments of the present invention taken in conjunction with the accompanying drawings.

BRIEF DESCRIPTION THE DRAWINGS

DESCRIPTION OF THE PREFERRED EMBODIMENTS

A ferroelectric liquid crystal sandwiched between a pair of substrates having alignment films subjected to parallel rubbing provides different bistable alignment states on the higher-temperature side and the lower-temperature side in its chiral smectic C phase temperature range. In the lower-temperature alignment state, the degree of enlargement of an apparent tilt angle with respect to an electric field intensity applied thereto is larger than in the higher-temperature alignment state. As a result, when the liquid crystal device comprising a chiral smectic liquid crystal placed in the lower-temperatures alignment state is used for a display apparatus, there is provided a substantially larger angle between average molecular axis directions under application of even a low voltage AC electric field than in the absence of such an AC electric field, so that a bright display with a high contrast is realized.

Hereinbelow, some embodiments of the present invention will be explained with reference to the drawings.

Figure 1:
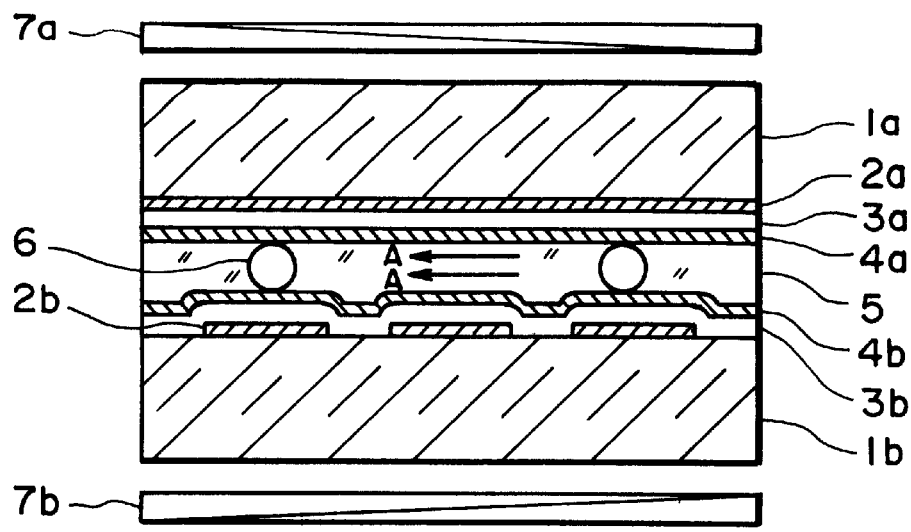
FIG. 1 is a schematic sectional view of a ferroelectric liquid crystal device according to an embodiment of the present invention.

FIG. 1 is a schematic partial sectional view of a ferroelectric smectic liquid crystal device according to the present invention.

The liquid crystal device comprises substrates (glass plates) 1a and 1b coated with transparent electrodes 2a and 2b, respectively, of $In_2O_3$, ITO (indium tin oxide), etc., which are further coated with insulating films 3a and 3b, respectively, of e.g., 200 Å to 1000 Å-thick films of $SiO_2$, $TiO_2$, $Ta_2O_5$, etc., and then with alignment control films 4a and 4b, respectively, of e.g., 50 Å to 1000 Å-thick films of polyimide, polyamide, polyester, etc. The alignment control films 4a and 4b have been subjected to rubbing in the directions of arrows A which are parallel with each other and identical in direction. A ferroelectric smectic liquid crystal 5 is disposed between the substrates 1a and 1b which are spaced from each other with a spacing (e.g., 0.1–3 microns) sufficiently small to suppress the formation of the helical structure of the ferroelectric smectic liquid crystal 5, so that the ferroelectric smectic liquid crystal 5 is placed in a bistable alignment state providing at least two stable orientation states. The sufficiently small spacing may be held by spacer beads 6 (silica beads, alumina beads, et.).

The thus formed cell structure is sandwiched between a pair of polarizers 7a and 7b arranged in cross nicols for optically discriminating the at least two stable orientation states of the liquid crystal molecules.

It has been found that a ferroelectric liquid crystal sandwiched between a pair of substrates provided with alignment control films rubbed in parallel directions provides different bistable alignment states on the higher-temperature side and the lower-temperature side in its chiral smectic C phase temperature range. The ferroelectric smectic liquid crystal in the lower-temperature bistable alignment state has an inclination of forming a connected pair of a hairpin defect and a lightning defect wherein the hairpin defect is formed after the lightning defect in the rubbing direction. In contrast thereto, in the higher-temperature bistable alignment state, the ferroelectric smectic liquid crystal has an inclination of forming a connected pair of a lightning defect and a hairpin defect in which the hairpin defect comes after the lightning defect in the rubbing direction. For convenience, in the chiral smectic C phase temperature range, the above-mentioned higher-temperature alignment state is referred to as C1 alignment or C1 sub-phase and the lower-temperature alignment state is referred to as C2 alignment state or C2 sub-phase. Herein, the expression of "for convenience" is used because the two different alignment states do not solely depend on temperature. The C1 alignment and C2 alignment have been described in detail in a prior application Ser. No. 245,644 (filed Sep. 16, 1988) by Hanyu et al.

In a specific embodiment for preparing a device, a ferroelectric smectic liquid crystal "CS-1011" (trade name, available from Chisso K.K.) was used as the liquid crystal 5. The alignment control films 4a and 4b were formed by using a polyimide "SP-710" (trade name, available from Toray K.K.) The pair of alignment control films 4a and 4b were provided with rubbing axes which were in parallel with each other and identical in directed. The pair of substrates were set to have a gap therebetween of 1.5 microns. The ferroelectric liquid crystal in the device was found to show the following phase transition series:

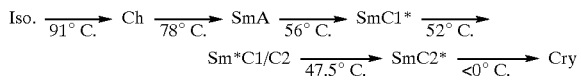

Herein, the respective symbols denote the following phases, Iso.: isotropic phase, Ch: cholesteric phase,
SmA: smectic A phase, SmC1*: smectic C1 alignment phase, Sm *C1/C2: mixture phase of C1 and C2 alignments,
SmC2*: smectic C2 alignment phase, and Cry: crystal.

We have discovered that the two alignment states (C1 and C2) in the SmC*(chiral smectic C phase) show substantially different changes in tilt angle $\theta_a$ under application of an AC electric field as will be described hereinbelow.

A device of the above-described structure including the liquid crystal placed in C2 alignment at 29° C. was subjected to application of a rectangular AC electric field of 60 kHz (>fth) with varying field intensities (volts/micron and the degree of enlargement of the apparent tilt angle $\theta_a$ was observed. The results (Example 1) are represented by Δ in FIG. 2. Further, the same device was heated to a temperature of 55° C. providing C1 and alignment and subjected to the same AC stabilization operation at that temperature. The results (Comparative Example 1) are represented by ○ in the same FIG. 2.

Figure 2:
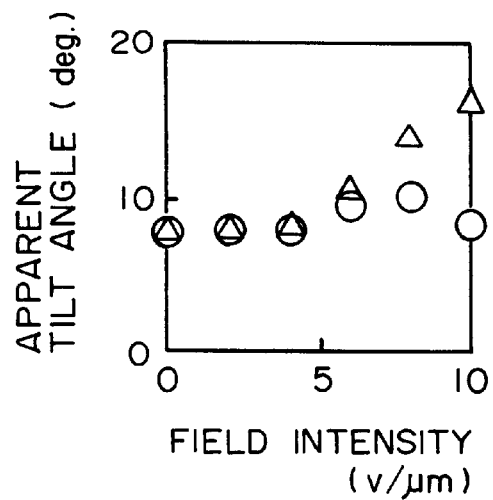
FIG. 2 is a graph showing the performances of the device shown in FIG. 1.

From the results shown in FIG. 2, it is clear that the device of Example 1 showed a substantially larger expansion of pretilt angle $\theta_a$ with respect to the AC electric field intensity than Comparative Example 1. More specifically, in the device of Example 1 in C2 alignment, the apparent tilt angle $\theta_a$ increased in accordance with an increase in AC electric field intensity, whereas in the device of Comparative Example 1 in C1 alignment, the apparent tilt angle did not cause a substantial change. Further, light leakage in the extinction position was decreased in accordance with an increase in AC field intensity in case of C2 alignment, whereas the light leakage did not cause a substantial change compared with that in the absence of an electric field. The reason why the apparent tilt angle and the darkness in the extinction state are changed in this way is that the torque due to dielectric anisotropy acts on a liquid crystal molecule to move the molecule from its position in the absence of an electric field. The reason why effects are not observed in C1 alignment is not clear, but the above difference may be attributable to a difference in degree of twist of molecular position between C1 alignment and C2 alignment which may be considered to result in a difference in direction of torque caused by dielectric anisotropy.

Anyway, the above difference in effect of AC electric field between the C1 and C2 alignment was one in kind and no intermediate effect was observed.

The liquid crystal "CS-1011" (available from Chisso K.K.) had a relatively large negative dielectric anisotropy $\Delta\epsilon \approx -4_o$ and was a material providing a large expansion of tilt angle under AC electric field. Further, the above alignment control film of "SP-710" (available from Toray K.K.) provided a relatively small pretilt angle of 0–1° in the SmA phase (at 62° C.).

Figure 3:
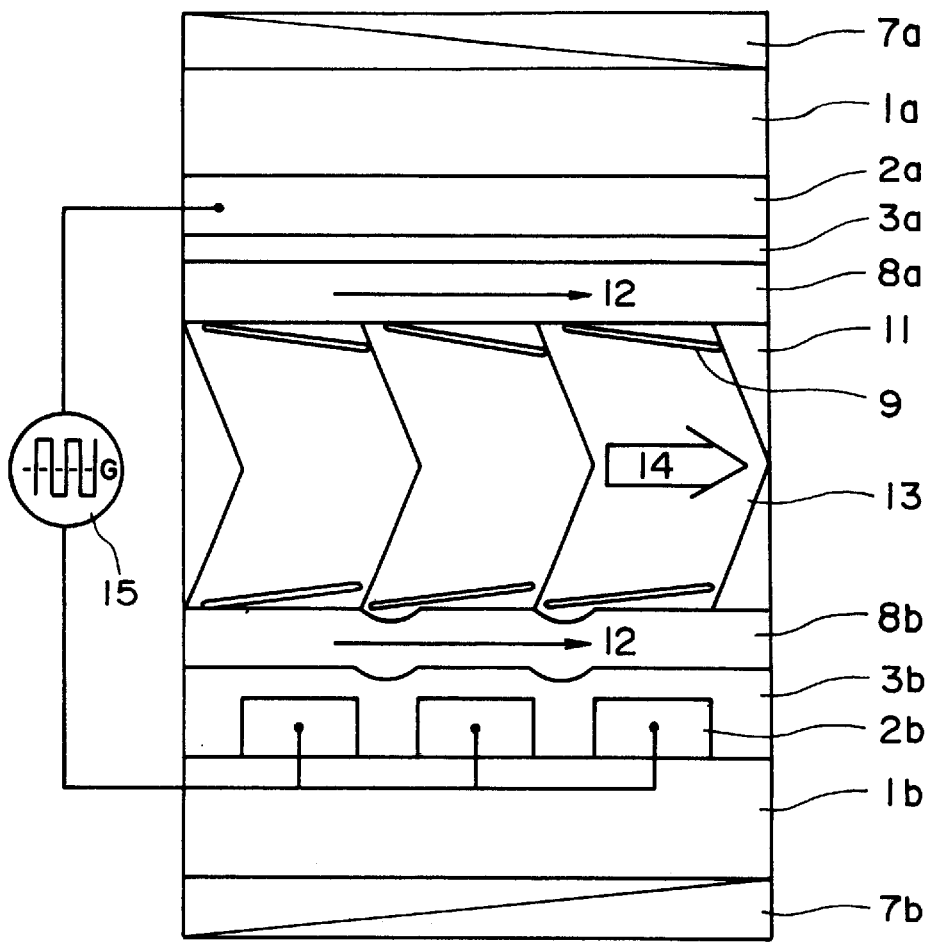
FIG. 3 is a schematic sectional view of a ferroelectric liquid crystal device according to another embodiment of the present invention.

FIG. 3 shows a ferroelectric liquid crystal device according to another embodiment of the present invention, which is the same as the one shown in FIG. 1 expect that it includes organic alignment (control) films 8a and 8b providing a pretilt angle of liquid crystal molecules in SmA phase of 1.5° or larger with respect to the alignment films. A bar denoted by reference numeral 9 in FIG. 3 represents a liquid crystal molecule in SmC*phase at the boundary with the alignment film 8a or 8b and illustrates that an increase pretilt angle in SmA phase affects an increase in SmC*phase. FIG. 3 further shows a ferroelectric layer 11 corresponding to the layer 5 in FIG. 1, rubbing directions 12 identical to each other, smectic liquid crystal molecular layers 13 and a direction 14 of the inclination of the molecular layers (indicating C2 alignment in connection with the rubbing direction 12), and a driving voltage application circuit 15. In a smectic embodiment under this category, a polyimide alignment film of "Sun-Ever 150" (trade name, available from Nissan Kagaku K.K.) providing a pretilt angle in SmA phase (62° C.) of about 3° was used. The ferroelectric liquid crystal in the device showed the following phase transition series:

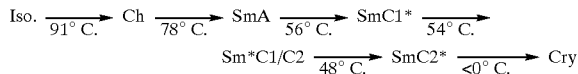

A device of the above-described structure in C2 phase at 29° C. was again subjected to application of a rectangular AC electric field of 60 kHz (>fth) with varying field intensities and the degree of enlargement of the apparent tilt angle $\theta_a$ was observed. The results (Example 2) are represented by $\Delta$ in FIG. 4. The effect of a higher pretilt angle is clearly shown. Further, the same device was heated to a temperature of 55° C. providing C1 alignment and subjected to the same AC stabilization operation at that temperature. The results (Comparative Example 2) are represented by ◯ in the same FIG. 4.

Figure 4:
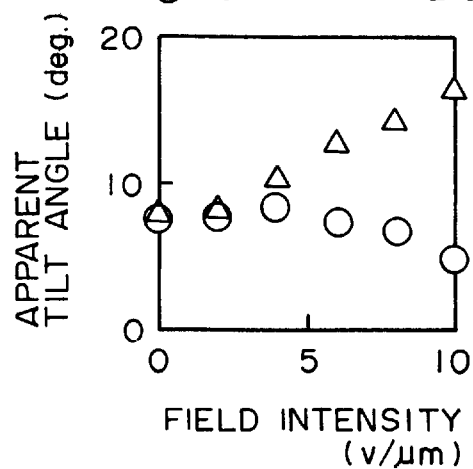
FIG. 4 is a graph showing the performances of the device shown FIG. 3.

In view of FIGS. 4 and 2 in comparison, in a device provided with alignment films giving an increased pretilt angle which have been subjected to parallel rubbing, it is understood that the difference in enlargement of the tilt angle $\theta_a$ under application of an AC electric field between the C1 and C2 alignments is increased, so that the tilt angle $\theta_a$ is more readily enlarged in C2 alignment while the enlargement of $\theta_a$ in C1 alignment becomes more difficult. Accordingly, if the alignment is controlled to provide a C2 alignment state and an AC electric field is applied thereto, a ferroelectric liquid crystal device providing a larger $\theta_a$ and thus a higher transmittance can be obtained.

Such an increase in difference between the C1 alignment and C2 alignment in a device provided with alignment films giving a higher pretilt angle and subjected to parallel rubbing, may be attributable to a directional pretilt angle of molecules at the boundaries which causes a difference in manner of twisting of molecules with respect to two layers with mutually opposite inclination. Actually, in a device provided with alignment films giving an increased pretilt angle subjected to parallel rubbing, an increase in internal energy difference was caused between the C1 and C2 alignments as described above, and a predominance of C2 alignment on the lower temperature side was observed. However, too large a pretilt angle results in too large an increase in barrier energy for transfer from C1 alignment to C2 alignment, so that it becomes difficult to form a perfect C2 alignment and fails to achieve freeness from defects. Accordingly, it is considered most desirable to use alignment films giving a pretilt angle of about 2–3° and subject the films to parallel rubbing.

As described above, according to the present invention, it is possible to provide an increased enlargement of apparent tilt angle at a relatively low voltage, whereby a bright display can be realized even at a low voltage. Accordingly, the problem of heat evolution is also alleviated.

Figure 5:
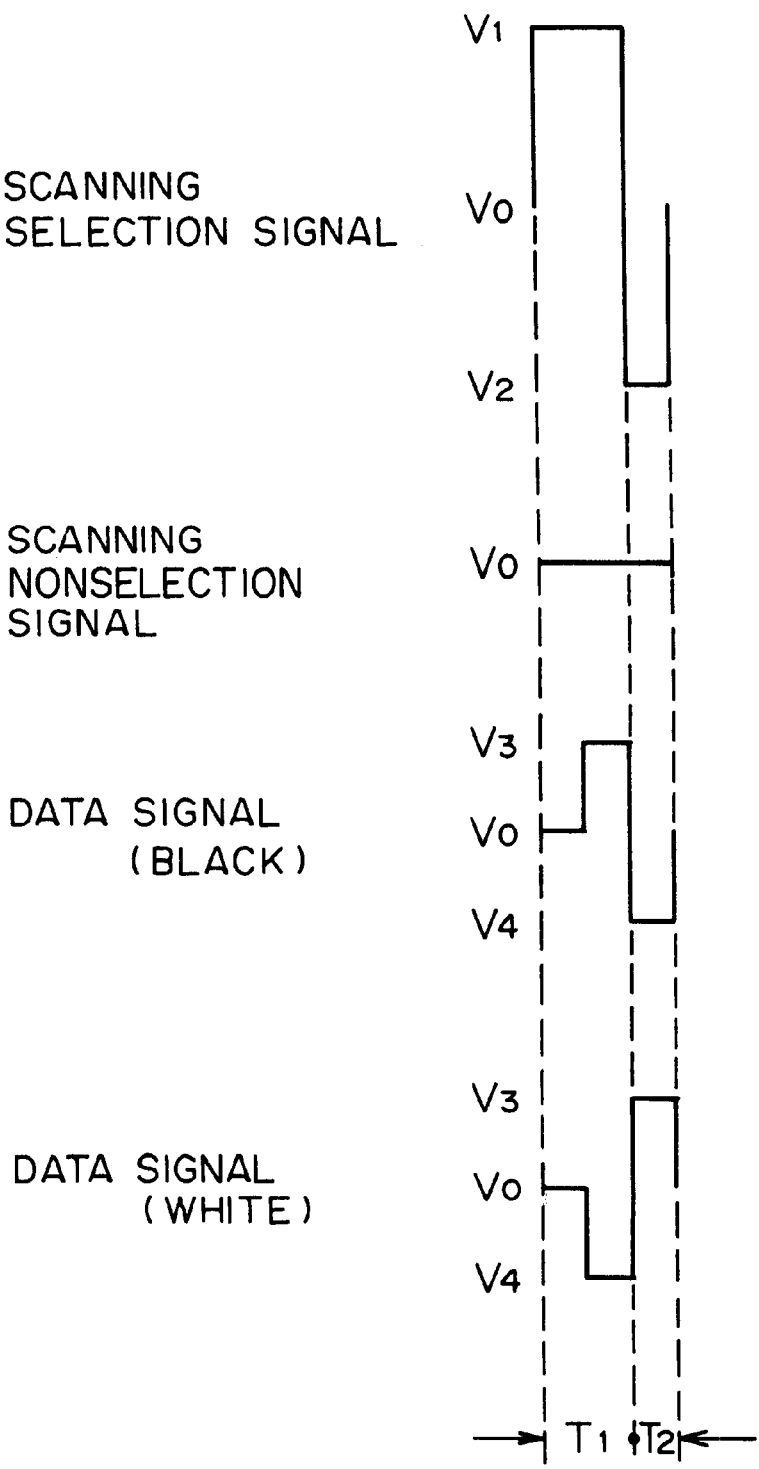
FIG. 5 is a diagram showing a set of driving waveforms used in a driving embodiment according to the present invention.

FIG. 5 shows a set of voltage waveforms used in a driving embodiment used in the present invention. In the driving embodiment shown in FIG. 5, all the pixels on a scanning line receiving a scanning selection signal are nonselectively cleared (into a black state in this embodiment) in a former half phase $T_1$ regardless of the types of data signals applied thereto. In a subsequent latter half phase $T_2$, the pixels on the scanning line are selectively written into a black or white state depending on the types of data signals of "black" or "white". Pixels on scanning lines are continuously supplied with an arbitrary succession of black and white data signals through the data lines, so that the pixels are supplied with an AC voltage. Accordingly this AC voltage can be used as an AC voltage insufficient to cause a switching from one to the other or from the other to one of the bistable alignment state. In the present invention, in addition to the above described embodiments, other driving methods as disclosed by U.S. Pat. Nos. 4,655,561 and 4,836,656 may also be used.

What is claimed is:

1. A liquid crystal apparatus, comprising:

(a) a liquid crystal device comprising:
        a pair of substrates each provided with a uniaxial alignment axis, and
        a chiral smectic liquid crystal having a negative dielectric anisotropy disposed between the pair of substrates and capable of forming a higher-temperature bistable alignment state and a lower-temperature bistable alignment state in its chiral smectic C phase, the chiral smectic liquid being further placed in the lower-temperature bistable alignment state formed by cooling from the higher-temperature bistable alignment state; and (b) a voltage application device including:
        AC voltage application circuitry for applying to the chiral smectic liquid crystal in the lower-temperature bistable alignment state an AC voltage insufficient to cause a switching from one to the other or from the other to one of the bistable alignment states, said AC voltage having a field intensity which exceeds 5V/$\mu$m,
        wherein said chiral smectic liquid crystal under application of a rectangular AC voltage having an electric field intensity exceeding 5 volts/$\mu$m at a frequency of 60 kHz has an increased apparent tilt angle when placed in said lower-temperature alignment state than the apparent tilt angle when placed in said higher-temperature alignment state; and
        switching voltage application circuitry for applying to the chiral smectic liquid crystal a voltage of one polarity sufficient to cause a switching from one to the other of the bistable alignment states and a voltage of the other polarity sufficient to cause a switching from the other to one of the bistable alignment states.

2. An apparatus according to claim 1, wherein said chiral smectic liquid crystal forms smectic A phase at a higher temperature than the smectic C phase and provides a pretilt angle of liquid crystal molecules in the smectic A phase of 1.5° or larger with respect to the substrates.

3. An apparatus according to claim 1, wherein said pair of substrates are parallel with each other and provided with the uniaxial alignment axes in the same direction.

4. An apparatus according to claim 3, wherein the uniaxial alignment axes have been provided by rubbing.

5. An apparatus according to claim 3, wherein the uniaxial alignment axes are provided to the surfaces of films of polyimide, polyamide or polyester formed on insulating films.

6. An apparatus according to claim 5, wherein aid insulating films comprise at least one oxide elected from the group consisting of silicon oxide, titanium oxide and tantalum oxide.

7. An apparatus according to claim 3, wherein said chiral smectic liquid crystal in the lower-temperature bistable alignment state has an inclination of forming a connected pair of a hairpin defect and a lightning defect, the hairpin defect being formed after the lightning defect in the uniaxial alignment axis direction.

8. A liquid crystal apparatus, comprising:
(a) a liquid crystal device comprising:
   a pair of substrates each provided with a uniaxial alignment axis, and
   a chiral smectic liquid crystal having a negative dielectric anisotropy disposed between the pair of substrates and capable of forming a higher-temperature bistable alignment state and a lower-temperature bistable alignment state in its chiral smectic C phase, the chiral smectic liquid being further placed in the lower-temperature bistable alignment state formed by cooling from the higher-temperature bistable alignment state, said chiral smectic liquid crystal forming smectic A phase at a higher temperature than the smectic C phase and providing a pretilt angle of liquid crystal molecules in the smectic A phase of 1.5° or larger with respect to the substrates; and
(b) a voltage application device including:
   AC voltage application circuitry for applying to the chiral smectic liquid crystal in the lower-temperature bistable alignment state an AC voltage insufficient to cause a switching from one to the other or from the other to one of the bistable alignment states,
   wherein said chiral smectic liquid crystal under application of a rectangular AC voltage having an electric field intensity exceeding 5 volts/$\mu$m at a frequency of 60 kHz has an increased apparent tilt angle when placed in said lower-temperature alignment state than the apparent tilt angle when placed in said higher-temperature alignment state; and
   switching voltage application circuitry for applying to the chiral smectic liquid crystal a voltage of one polarity sufficient to cause a switching from one to the other of the bistable alignment states and a voltage of the other polarity sufficient to cause a switching from the other to one of the bistable alignment states.

9. An apparatus according to claim 8, wherein said pair of substrates are parallel with each other and provided with the uniaxial alignment axes in the same direction.

10. An apparatus according to claim 9, wherein the uniaxial alignment axes have been provided by rubbing.

11. An apparatus according to claim 9, wherein the uniaxial alignment axes are provided to the surfaces of films of polyimide, polyamide or polyester formed on insulating films.

12. An apparatus according to claim 11, wherein said insulating films comprise at least one oxide selected from the group consisting of silicon oxide, titanium oxide and tantalum oxide.

13. An apparatus according to claim 9, wherein said chiral smectic liquid crystal in the lower-temperature bistable alignment state has an inclination of forming a connected pair of a hairpin defect and a lightning defect, the hairpin defect being formed after the lightning defect in the uniaxial alignment axis direction.

* * * * *

UNITED STATES PATENT AND TRADEMARK OFFICE
CERTIFICATE OF CORRECTION

PATENT NO. : 6,304,310 B1
DATED : October 16, 2001
INVENTOR(S) : Hideyuki Kawagishi et al.

It is certified that error appears in the above-identified patent and that said Letters Patent is hereby corrected as shown below:

Column 1,
Line 60, "A" should read -- a --.

Column 2,
Line 54, "temperatures" should read -- temperature --.

Column 3,
Line 50, "K.K.)" should read -- K.K.). --; and
Line 52, "directed." should read -- direction. --.

Column 4,
Line 51, "expect" should read -- except --.

Column 6,
Line 58, "aid" should read -- said --; and
Line 59, "elected" should read -- selected --.

Signed and Sealed this

Eleventh Day of February, 2003

JAMES E. ROGAN
*Director of the United States Patent and Trademark Office*